United States Patent [19]

Ostwald

[11] Patent Number: 5,418,664
[45] Date of Patent: May 23, 1995

[54] INDEXING HAND FOR ROBOTIC STORAGE LIBRARY

[75] Inventor: Timothy C. Ostwald, Louisville, Colo.

[73] Assignee: Storage Technology Corporation, Louisville, Colo.

[21] Appl. No.: 139,199

[22] Filed: Oct. 20, 1993

[51] Int. Cl.⁶ .................... G11B 15/68; G11B 17/22
[52] U.S. Cl. ........................ 360/92; 369/178
[58] Field of Search ................ 369/34, 36, 37, 38, 369/39, 178, 191, 192, 193, 194; 360/92; 198/803.9; 364/478; 294/110.1, 110.2, 115, 116; 901/32, 36, 38, 39; 414/732, 733, 741, 751, 932

[56] References Cited

U.S. PATENT DOCUMENTS

| | | | |
|---|---|---|---|
| 4,607,354 | 8/1986 | Ishibashi et al. | 369/39 |
| 4,907,889 | 3/1990 | Simone | 360/92 |
| 4,908,777 | 3/1990 | Wolfe | 364/513 |
| 5,041,929 | 8/1991 | Fryberger et al. | 360/92 |
| 5,182,687 | 1/1993 | Campbell et al. | 360/92 |
| 5,226,779 | 7/1993 | Yeakley | 414/753 |
| 5,253,911 | 10/1993 | Egan | 294/116 |
| 5,277,540 | 1/1994 | Helms | 414/751 |

FOREIGN PATENT DOCUMENTS

| | | | |
|---|---|---|---|
| 4017633 | 12/1990 | Germany | 360/92 |
| 1-274986 | 11/1989 | Japan | 901/38 |

*Primary Examiner*—John H. Wolff
*Assistant Examiner*—William J. Kimowicz
*Attorney, Agent, or Firm*—Duft, Graziano & Forest

[57] ABSTRACT

The present invention comprises a robotic gripping hand capable of holding multiple storage media cartridges for retrieving and depositing cartridges within a storage library subsystem. The invention comprises a method and apparatus for indexing a tray adapted to hold multiple storage cartridges. The tray is attached to the robotic hand to enable the hand to select among several cartridges to be manipulated by a single gripper subassembly. The gripper subassembly may retrieve a cartridge from a storage library subsystem and insert it into an available position in the indexing tray without affecting other cartridges already retained in other positions of the indexing tray. Likewise the gripper may remove a cartridge from a position in the indexing tray and return it to the storage library subsystem without affecting other cartridge already retained in other positions of the indexing tray. The invention further comprises the use of beveled perpendicular opposing gears and "one-way" ratcheting clutches to permit a single drive motor to control the motion to index the tray as well as the motion of the gripper subassembly to extend forward and backward to retrieve or deposit storage cartridges. Turning the drive motor in one direction controls the extension motion without affecting the position of the indexing tray. Turning the drive motor in the opposite direction moves the indexing tray without affecting the position of the gripper subassembly.

8 Claims, 5 Drawing Sheets

INDEXING HAND FOR ROBOTIC STORAGE LIBRARY

FIELD OF THE INVENTION

This invention relates to robotic manipulation of storage media cartridges in a storage library subsystem. More specifically, this invention relates to a robotic hand capable of holding and manipulating multiple storage media cartridges and selecting among them by indexing a tray which stores the cartridges.

PROBLEM

Storage library subsystems are capable of storing and rapidly retrieving large quantities of information stored on storage media cartridges. Such storage library subsystems frequently utilize robotic mechanisms to improve the speed of information retrieval and the reliability of maintaining the storage library inventory of cartridges. Robotic mechanisms used in such storage library subsystems typically comprise a "hand" positioned on a moveable "arm". To retrieve information, the robotic arm is moved to position the hand near the inventoried location of a desired media cartridge. The hand is then activated to grip the desired cartridge and remove it from the library inventory location. The robotic arm with the hand gripping the cartridge then moves to an appropriate position to further process the cartridge (a device for reading or writing the information on the cartridge or an operator access position to physically retrieve the cartridge). The robotic hand then deposits the cartridge for further processing. Similar steps in reverse order are used to deposit the media cartridge into the inventory locations of a storage library subsystem.

One common activity in storage library subsystems is to retrieve a previously deposited cartridge from a read/write device, return it to the library inventory, and deposit the next logically sequential cartridge into the read/write device. This action is typically referred to as a "media exchange". Media exchange is common in tape libraries for writing or reading large volumes of information to or from a computer system archival backup. Such large archival backups frequently utilize several media cartridges to hold the vast volume of data required. The time required for tape exchange (media exchange) in this application is critical to the overall performance of a tape library in retrieving or creating such large archival backups.

Heretofore, typical library robotic hands were capable of holding only a single media cartridge. The media exchange process described above then required several steps involving time consuming motion of the robotic arm and hand. First, the arm and hand would move to the read/write device and retrieve the cartridge stored therein. The arm and hand then move to return the retrieved cartridge to the library inventory. Next, the arm and hand move to the library inventory location of the next sequential cartridge and retrieve it. Finally, the arm and hand return to the read/write device and deposit the next cartridge for further processing therein. The overall performance of a storage library subsystem in manipulating large multiple cartridge archives of information is hindered by the number of movements required to exchange the previous media cartridge with the next cartridge at the read/write device. During these motions, the read/write device is without a media cartridge to store or retrieve information.

Some prior designs such as the IBM 3495 have attempted to resolve this performance problem by adding a staging station near the read/write device. The staging station is capable of holding several cartridges and automatically moving them sequentially into the read/write device as the previous cartridge is moved out of the read/write device. This solution permits the robotic arm and hand to retrieve several cartridges likely to be required in sequential order and "stage" them for use at the staging station near the read/write device. The read/write device may thus utilize the next cartridge sequentially available in the staging station without delay waiting for the robotic arm to exchange the storage cartridge. The robotic arm and hand may move cartridges to and from the staging station simultaneously with the read/write device accessing of another cartridge fed from the staging area.

Though this solution reduces the time consumed by movement of the robotic arm and hand between sequential cartridges, new problems are presented. First, the staging station itself adds substantial complexity to the read/write device. The staging station mechanism is essentially another robotic device capable of removing one cartridge from the read write device and inserting another. In addition, the staging mechanism has the added complexity of maintaining and manipulating the used and unused cartridges in a stack. A second problem with the staging station solution arises in the situation where a higher priority request for a storage cartridge needs to be serviced by a particular drive in the middle of a lower priority request involving sequential cartridges. If there are several cartridges of the lower priority sequential request already retrieved and deposited into the staging station, they may need to be "unstaged" to insert the cartridge required for the higher priority request. This potential need to "unstage" previously staged cartridges may add significant time to the process thereby reducing overall performance of a storage library subsystem.

Another approach to improving the performance of a library subsystem in performing media exchange is disclosed in U.S. Pat. No. 4,907,889 by Raymond J. Simone. Simone discloses a storage library subsystem in which the robotic arm has two hands attached to its free end. The two hands are separated from one another at approximately a ninety degree angle. A motorized mechanism rotates the two hands through the above described angle of separation so that each hand may be independently positioned to retrieve and deposit video cassette cartridges. This solution improves the performance of media exchange activity in a storage library subsystem by reducing the time between exchanges. To exchange cartridges, the robotic arm of the Simone design moves to the library inventory location of the next required cartridge and retrieves the cartridge using one of its two free hands. Next, the arm and hands are moved to the read/write device. The robot then rotates the remaining free hand to extract the previous cartridge from the read/write device. The next cartridge is then rotated into position and deposited in the read/write device for further processing. The robotic arm and hand is then be moved to deposit the previous cartridge back into its inventoried location in the storage library subsystem. This action reduces the time for media exchange in that much of the robotic arm motion overlaps with the read/write device usage of a cartridge. The next cartridge may be retrieved while the previous cartridge is in use by the read/write device and the previous cartridge may be next cartridge deposited for further processing.

The Simone solution adds significant complexity by duplicating the entire hand assembly and by adding the mechanism to rotate the two hands through their angle of separation. Extrapolating from two hands to more potentially adds more complexity by duplicating the hand assembly for each additional cartridge to be simultaneously held by the multiple hand robotic arm.

SOLUTION

The present invention comprises a method and apparatus for manipulating multiple storage media cartridges by using a single robotic hand. The invention further comprises a tray cooperatively engaged with the robotic hand and capable of receiving multiple media cartridges. Cartridges are moved into or out of the tray by a single gripper subassembly of the robotic hand. The motion of the gripper subassembly into and out of selected tray slots is hereafter referred to as "extension". The tray is raised or lowered as required to position one of the multiple tray slots at the location of the gripper subassembly. This permits the gripper to move a cartridge into or out of the selected tray slot. This motion of the tray is referred to as "indexing". The robotic hand of the present invention can manipulate one media cartridge into and out of an indexing tray slot without affecting other cartridges held in other slots of the indexing tray. The use of bevelled gears and one-way (ratcheting) clutches in the design of the present invention permits both the indexing of the tray and the extension motion of the gripper subassembly to be controlled by a single motor. This simple design solves the problems described above relating to prior designs and does so with significantly less complexity than is disclosed by Simone.

The present invention improves the performance of media exchange operations as compared to earlier robotic hand designs exchange operation utilizing the hand of the present invention starts by moving the robotic arm with the indexing hand to the library inventory location of the next desired media cartridge. The hand retrieves the desired cartridge from its inventory location in the storage library subsystem and inserts it in one of the multiple empty slots of the indexing tray. As the robotic arm moves to the read/write device, the hand moves (indexes) the tray so that another empty tray slot is aligned with the gripper subassembly of the hand. Next, the hand retrieves the cartridge currently being processed by the read/write device and inserts it in the empty tray slot currently aligned with the gripper. The hand of the present invention now moves (indexes) the tray back to the tray slot position retaining the next cartridge. The gripper then deposits the next cartridge in the read/write device for further processing. Finally, the robotic arm moves to an appropriate library inventory location and returns the processed cartridge to the library inventory.

This improves upon the earlier single cartridge manipulating hands by permitting the robotic arm motion involved in media exchange time to be overlapped with storage device read/write activity. The present invention provides this performance increase with far less complexity than the staging station approach of the IBM 3495 or the rotating multiple hand disclosed by Simone.

The present invention provides an added benefit as compared to single cartridge manipulating hands or the staging station solution of the IBM 3495. The present invention is capable of simultaneously transporting multiple cartridges from an operator access port into inventory locations of a storage library subsystem. This improves the speed of operations required to load large quantities of new cartridges into the library inventory. Such mass loading operation may take place when a storage library subsystem is first installed or periodically in library maintenance.

The present invention provides another benefit as compared to the staging station solution of the IBM 3495. As described above, the staging station solution creates a problem when lower priority cartridges must be "unstaged" to permit operation on a higher priority requested cartridge. The indexing hand of the present invention does not create this problem because cartridges are retrieved when needed for exchange rather than staged in a predetermined order. The present invention achieves the desired performance improvement in media exchange while permitting the servicing of high priority cartridges in between cartridge exchanges.

An alternative embodiment of the present invention permits different slots of the indexing tray to be adapted to receive varying media cartridges. This feature of the present invention permits easier implementation of a multiple media storage library subsystem by permitting a single robotic arm and robotic hand to manipulate the various storage cartridges.

DETAILED DESCRIPTION

Figure 1:
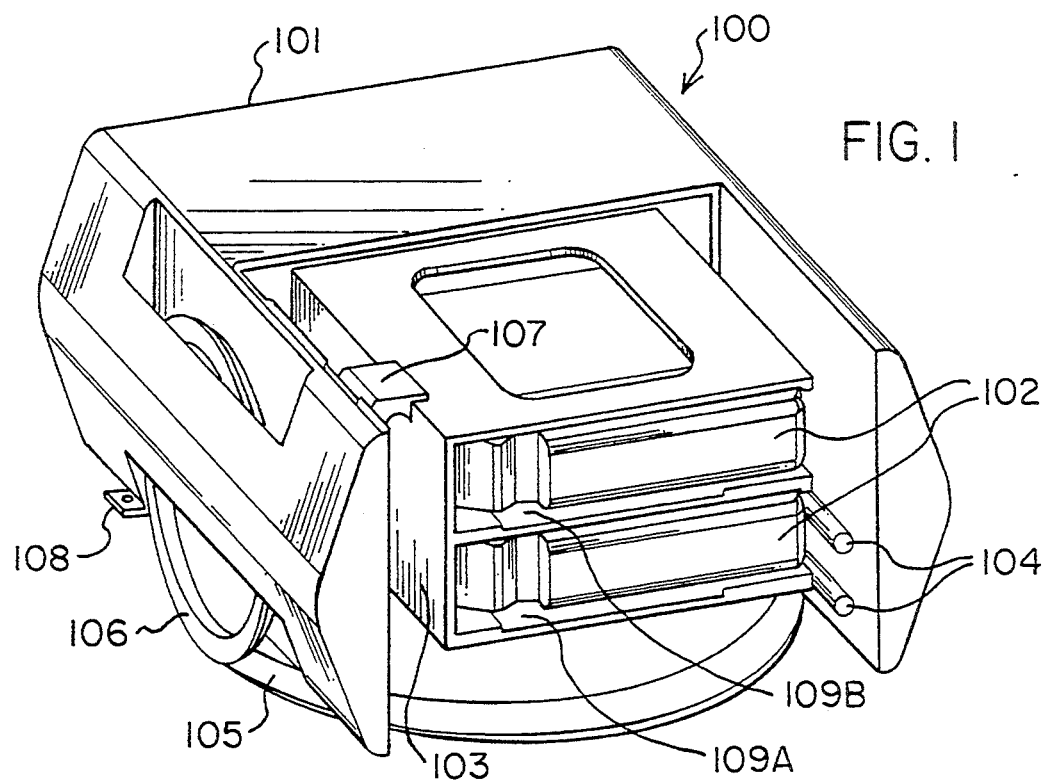
FIG. 1 shows a perspective view of one exemplary embodiment of the indexing hand of the present invention.

One possible exemplary embodiment of the present invention is depicted in FIG. 1. Indexing hand 100 is attached to a robotic arm (not shown) at the rear of housing 101. The robotic arm positions indexing hand 100 to permit the hand to retrieve or deposit storage media cartridges 102 in a storage library subsystem (not shown). Storage media cartridges 102 are held in indexing tray 103 as indexing hand 100 is moved by the robotic arm within the storage library subsystem. Indexing hand 100 may retrieve storage media cartridges 102 from one position in the storage library subsystem and then deposit the cartridges in another location. Such movement of storage media cartridges is common within a storage library subsystem to move cartridges between inventory locations of a storage library subsystem and storage read/write devices which process data stored within the storage cartridges.

Indexing tray 103 of FIG. 1 may be moved vertically up and down. Linear slide bearing 107 of FIG. 1 is affixed to indexing tray 103 and is slidably attached to housing 101. Linear slide bearing 107 guides indexing tray 103 as it is moved vertically up and down by secondary beveled gear 106. Details of the motion of indexing tray 103 are described later.

Figure 2:
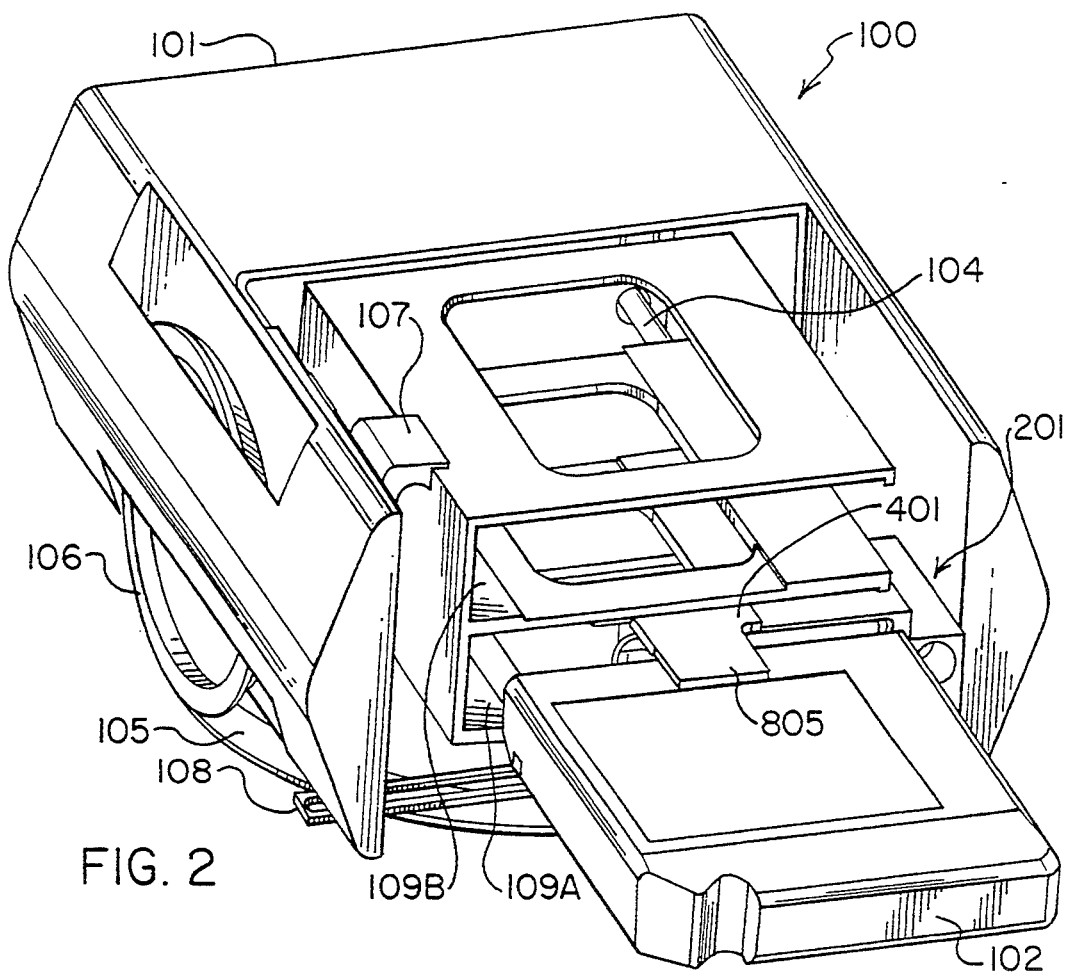
FIG. 2 shows a perspective view of the embodiment of FIG. 1 with the gripper subassembly extended to move a cartridge out of the indexing tray.

Indexing tray 103 of FIG. 1 is moved vertically up and down to align one of the slots 109A or 109B with picker assembly 201 of FIG. 2. When so aligned, picker assembly 201 of FIG. 2 may slide forward and rearward while gripping a storage media cartridge 102. This permits a storage media cartridge 102 to be retrieved into or deposited from either of slots 109A and 109B in indexing tray 103.

Picker assembly 201 of FIG. 2 (described in more detail later) slides on extension rails 104 and is adapted to controllably grip and release storage media cartridges 102. Picker assembly 201 is shown in a forward position in FIG. 2 gripping a storage media cartridge 102. This forward position is in preparation to retract storage media cartridge 102 into slot 109A of indexing tray 103 or to deposit storage media cartridge 102 into an inventory location of a storage library subsystem (not shown). In FIG. 1, picker assembly 201 of FIG. 2 is retracted to a rearward position (hence not shown). Indexing tray 103 may be moved vertically up and down when picker assembly 201 is retracted to this rearward position. Picker assembly 201 is moved forward and rearward through cooperative motion of primary beveled gear 105 and extension drive slot 108 of FIG. 1. Details of the motion of picker assembly 201 are described later.

Picker assembly 201 is capable of gripping and releasing a storage media cartridge 102 as the picker is moved forward or rearward. Details of the operation of the gripper portions of picker assembly 201 are described later.

Picker Assembly Extension Motion

Figure 4:
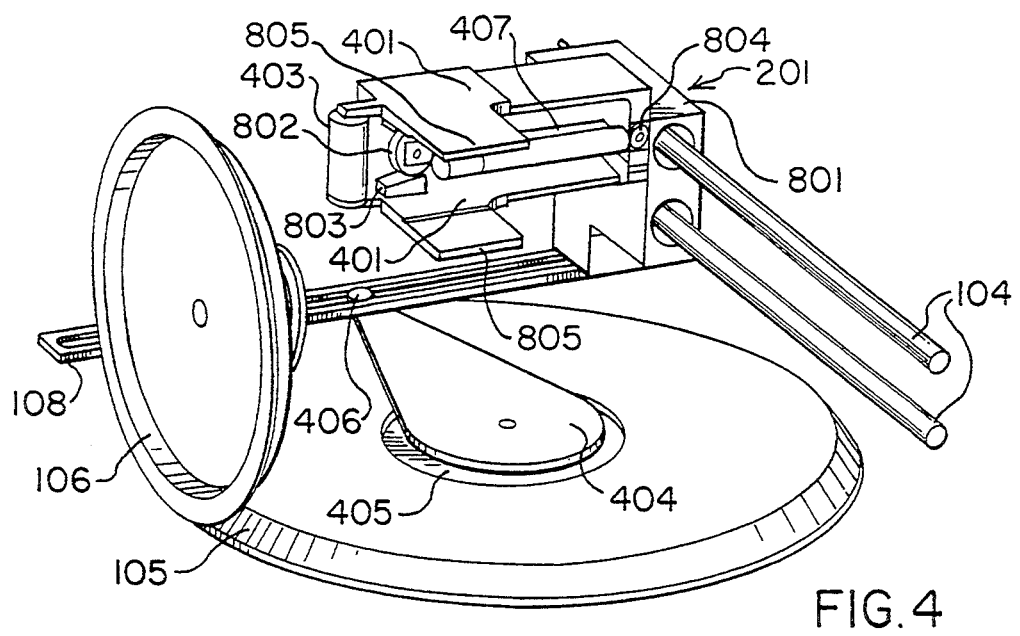
FIG. 4 shows a perspective view of the gripper mechanism of the embodiment of FIG. 1 retracted by the bevelled lower gear.
Figure 5:
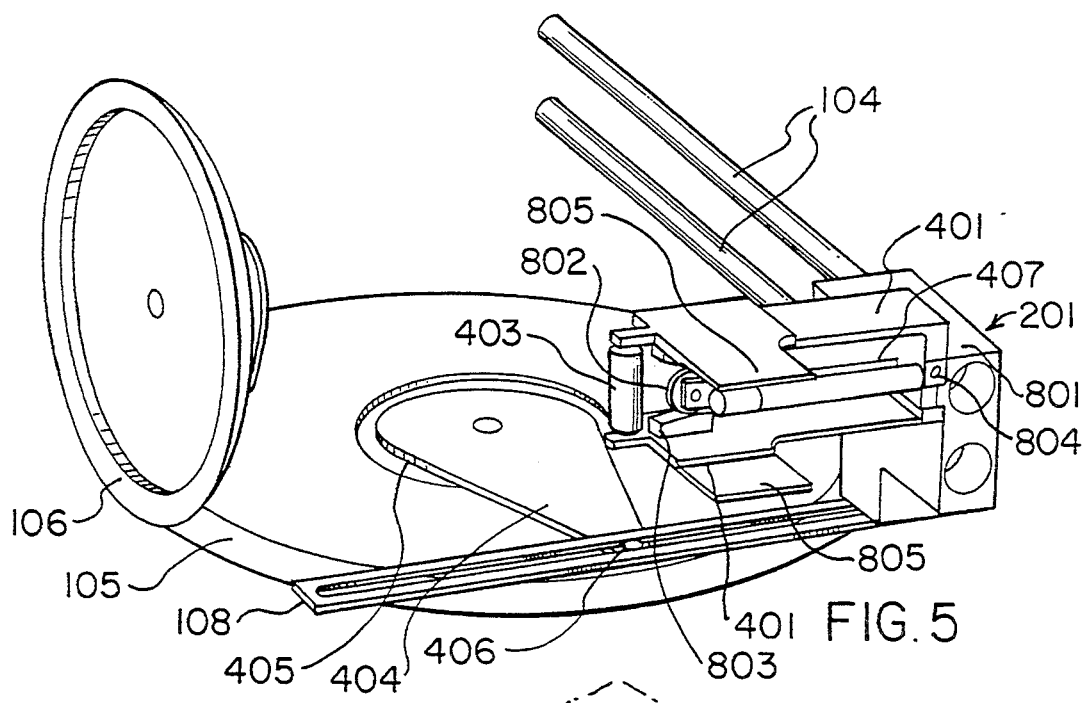
FIG. 5 shows a perspective view of the gripper mechanism of FIG. 4 fully extended by the bevelled lower gear.

FIGS. 4 and 5 depict picker assembly 201 slidably attached to extension rails 104 with housing 101 and indexing tray 103 of FIG. 1 removed for added clarity. Picker assembly 201 in FIGS. 4 and 5 is affixed to extension drive slot 108. Extension crank 404 is attached to primary beveled gear 105 by ratcheting clutch 405. A motor or other drive mechanism (not shown) turns primary beveled gear 105 on the axis at its center perpendicular to a plane parallel to the top surface of primary beveled gear 105. Ratcheting clutch 405 forces extension crank 404 to turn with primary beveled gear 105 when the motor (not shown) turns primary beveled gear 105 in the clockwise direction. Ratcheting clutch 405 slips to maintain extension crank 404 stationary with respect to primary beveled gear 105 when the motor (not shown) turns primary beveled gear 105 in the counterclockwise direction.

Extension cam follower 406 is affixed to the end of extension crank 404 opposite its axis of rotation. Extension cam follower 406 is adapted to slide within extension drive slot 108 as extension crank 404 is turned in the clockwise direction. Extension drive slot 108 is affixed to picker assembly 201 and forces picker assembly 201 to slide on extension rails 104 to a forward position as extension cam follower 406 slides in extension drive slot 108 through clockwise rotation of extension crank 404 and primary beveled gear 105. Clockwise rotation of primary beveled gear 105 through 180 degrees moves picker assembly 201 from its rearward position as depicted in FIG. 4 to its forward position as depicted in FIG. 5. A second 180 degrees clockwise rotation of primary beveled gear 105 returns picker assembly 201 to its rearward position as depicted in FIG. 4.

A full 360 degree clockwise rotation of primary beveled gear 105 imparts a full cycle of motion to picker assembly 201 starting at it rearward position, moving fully forward, then returning to its rearward position. Counterclockwise rotation of primary beveled gear 105 imparts no motion to picker assembly 201 because ratcheting clutch 405 slips.

Figure 3:
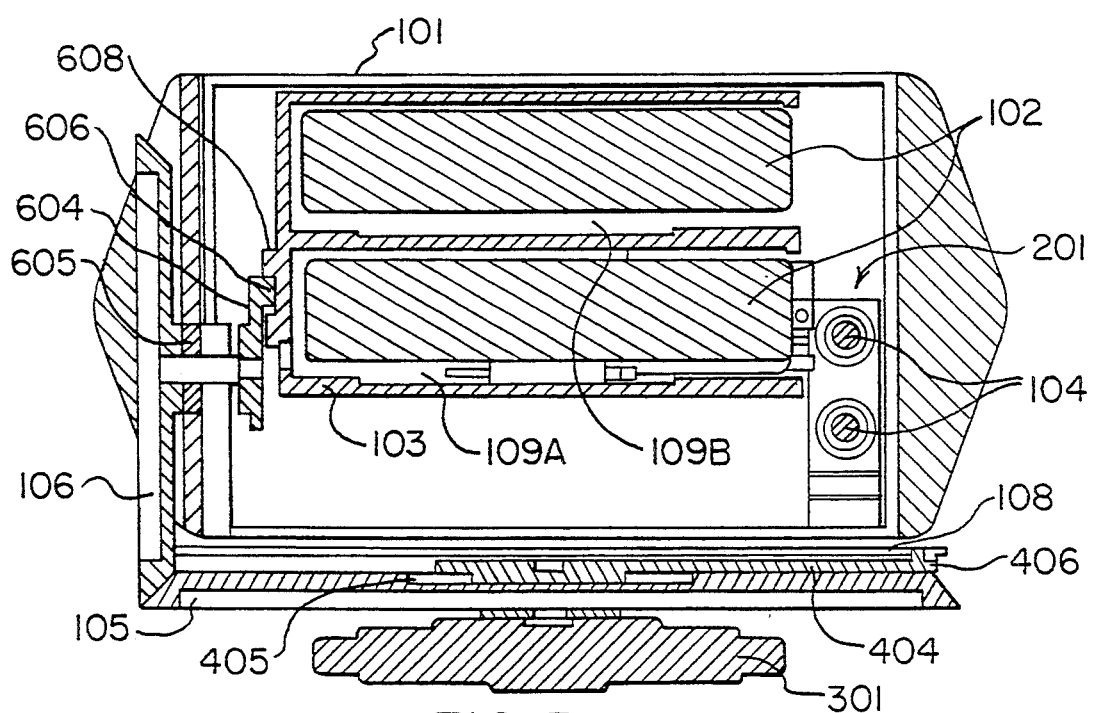
FIG. 3 shows of front sectional view of the embodiment of FIG. 1.

Indexing tray 103 as shown from a front view in FIG. 3 is open at its right side to permit picker assembly 201 to slide forward and backward on slide rails 104. Gripper jaws 401 and lips 805 may grip a media cartridge 102 as picker assembly 201 slide forward and backward through a slot 109A or 109B currently vertically aligned with picker assembly 201. FIG. 2 depicts picker assembly 201 slid forward through slot 109A of indexing tray 103 while jaws 401 and lips 805 grip media cartridge 102.

Indexing Tray Motion

Figure 6:
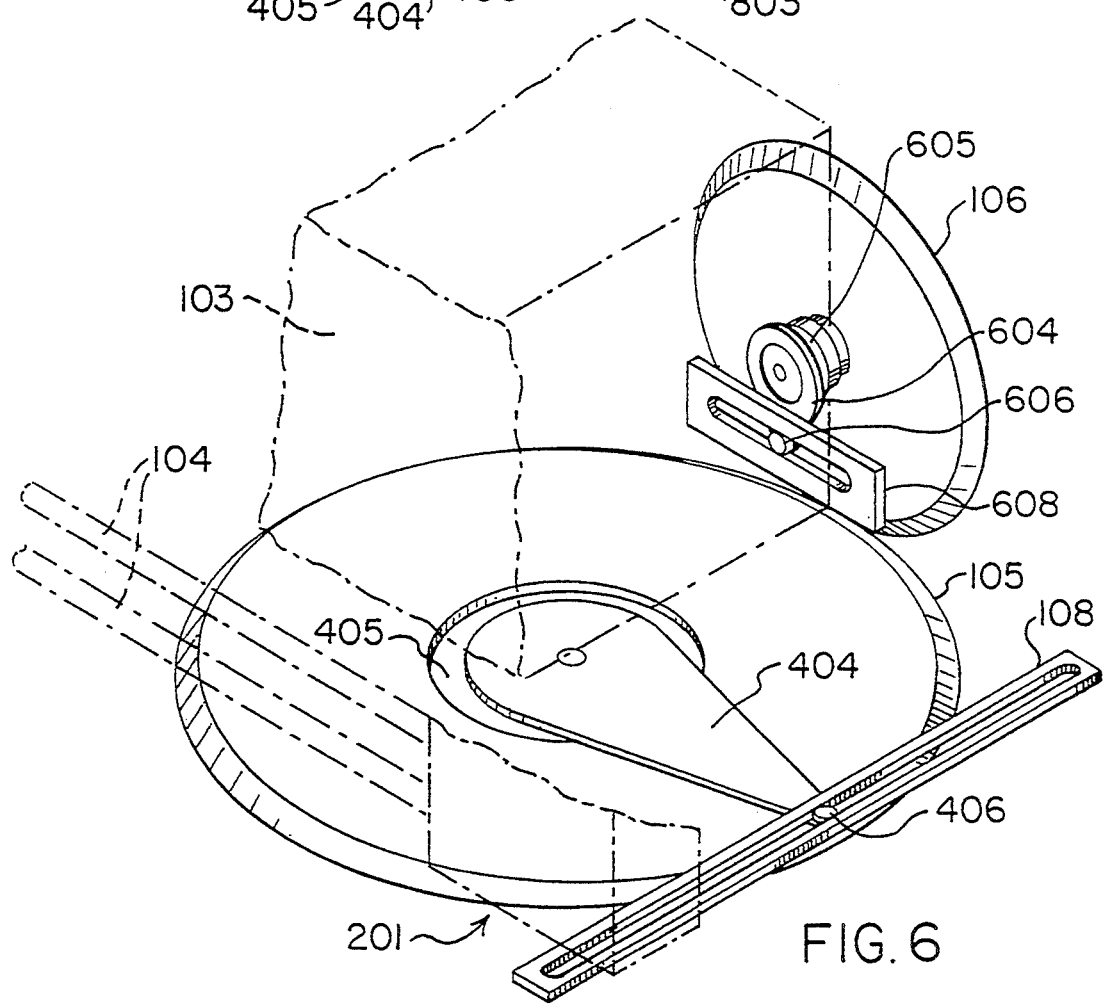
FIG. 6 shows a perspective view of the indexing mechanism of the embodiment of FIG. 1 with the indexing tray positioned at a lower position.
Figure 7:
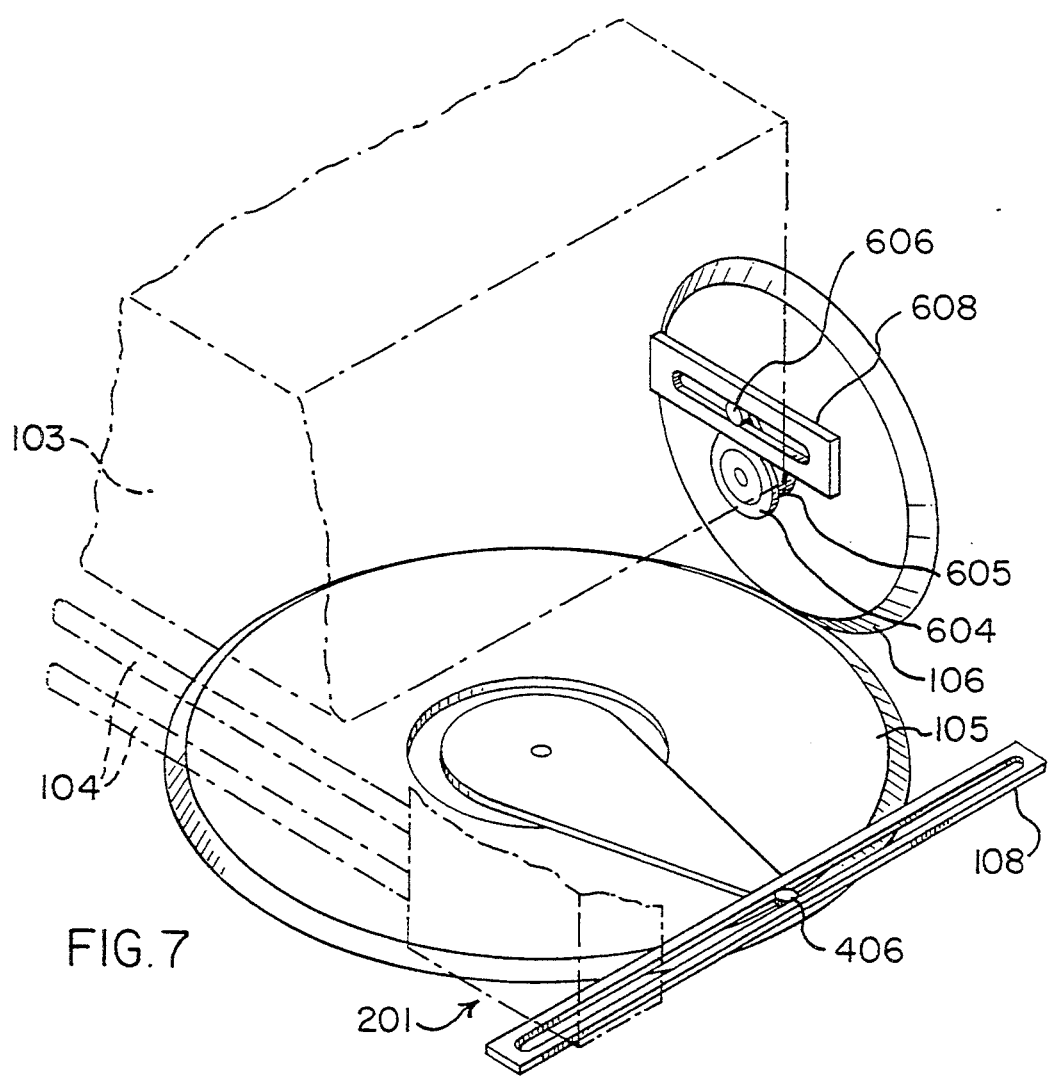
FIG. 7 shows a perspective view of the indexing mechanism of FIG. 6 with the indexing tray positioned at an upper position.

FIGS. 6 and 7 depicts the mechanism of the present invention which moves indexing tray 103 vertically up and down within indexing hand 100 of FIG. 1. In FIGS. 6 and 7, housing 101 of FIG. 1 is removed for added clarity. Indexing tray 103, picker assembly 201 and extension rails 104 are all depicted as dashed lines to permit a view of the indexing mechanism. Secondary beveled gear 106 of FIG. 6 meets primary beveled gear 105 at a right angle. The axes of rotation for both primary beveled gear 105 and secondary beveled gear 106 are fixed with respect to one another and held in position by housing 101 of FIG. 1. The gear teeth (not shown) at the beveled edges of both gears mesh such that when primary beveled gear 105 is driven in one direction of rotation secondary beveled gear 106 rotates in the opposite direction in a plane perpendicular to the surface of primary beveled gear 105.

Index crank 604 is attached to secondary beveled gear 106 by ratcheting clutch 605. When primary beveled gear 105 is driven to rotate in a clockwise direction by motor 301 of FIG. 3, secondary beveled gear 106 is driven to rotate in the counterclockwise. In this direction of rotation ratcheting clutch 605 slips so as to keep indexing crank 604 stationary with respect to secondary beveled gear 106. When primary beveled gear 105 is driven counterclockwise, secondary beveled gear 106 is driven in the clockwise direction. In this direction of rotation, ratcheting clutch 605 engages so as to drive indexing crank 604 to rotate clockwise with secondary beveled gear 106. Clockwise rotation of primary beveled gear 105 is used to rotate picker assembly 201 as described above. During such motion indexing crank 604 is held stationary with respect to the rotation of secondary beveled gear 106 because of the slippage of ratcheting clutch 605. Counterclockwise rotation of primary beveled gear 105 leaves picker assembly 201 stationary as described above. During this motion indexing crank 604 is driven to rotate with secondary beveled gear 106 due to the engaging of ratcheting clutch 605.

Indexing cam follower 606 is attached to the end of indexing crank 604 opposite its axis of rotation. Indexing cam follower 606 is adapted to slide within index drive slot 608 as indexing crank 604 is rotated by secondary beveled gear 106. Index drive slot 608 is affixed to the side of indexing tray 103 adjacent to secondary beveled gear 106 and forces indexing tray 103 to slide vertically up or down on linear slide bearing 107 within housing 101 of FIG. 1. Counterclockwise rotation of primary beveled gear 105 through 180 degrees moves indexing tray 103 from its lower position as depicted in FIG. 6 to its upper position as depicted in FIG. 7. Continuing through a second 180 degrees counterclockwise rotation of primary beveled gear 105 returns indexing tray 103 to its lower position as depicted in FIG. 6.

A full 360 degree counterclockwise rotation of primary beveled gear 105 imparts a full cycle of motion to indexing tray 103 starting at it lower position, moving fully upward, then returning to its lower position. Clockwise rotation of primary beveled gear 105 imparts no motion to indexing tray 103 because ratcheting clutch 605 slips.

Picker Assembly

Figure 8:
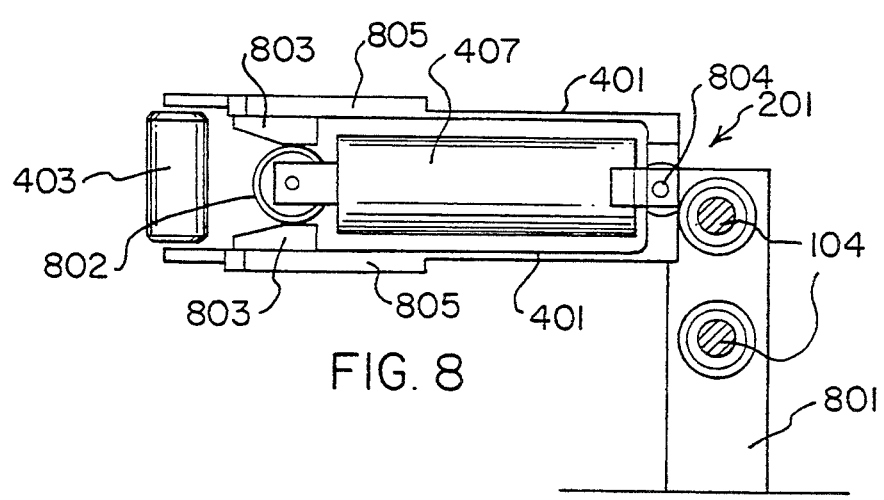
FIG. 8 shows a front view of the gripper mechanism of the embodiment of FIG. 1 with the solenoid at rest in position to fully open the gripper jaws.
Figure 9:
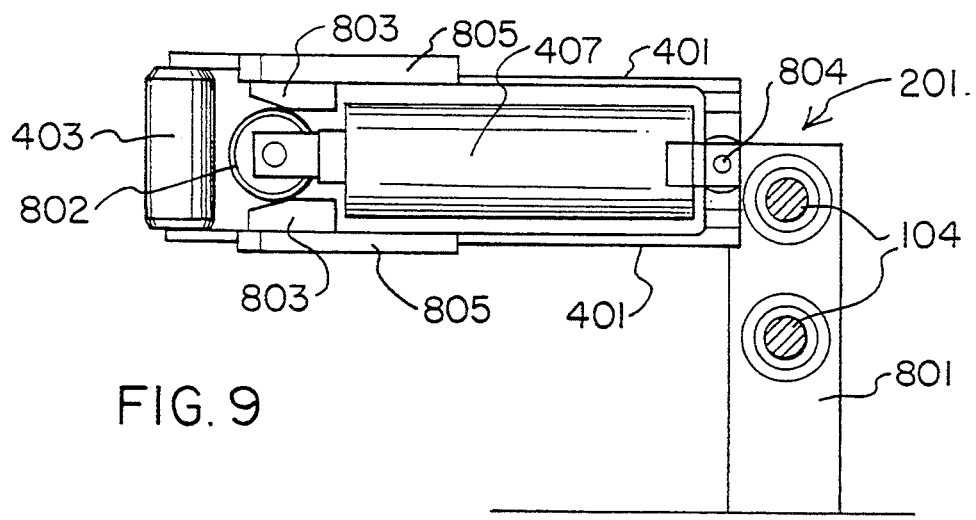
FIG. 9 shows a front view of the gripper mechanism of FIG. 8 with the solenoid at rest in position to fully close the gripper jaws.

Picker assembly 201 of FIG. 2 is depicted in further detail in FIGS. 8 and 9. FIGS. 4 and 5 depict some detail of picker assembly 201 with a perspective side view. Picker assembly 201 is best understood with reference to FIGS. 4, 5, 8 and 9 together. Picker carriage 801 of FIG. 8 slides on extension rails 104. The right end of each of two gripper jaws 401 is pivotally attached to picker carriage 801 at hinge 804. The left ends of each gripper jaw 401 are attached to one another with spring 403 to draw them to a closed position toward one another as depicted in FIG. 8. The left end of each gripper jaw 401 curves forward as shown in FIGS. 4 and 5 to form lips 805. Lips 805 grip a cartridge (not shown) when spring 403 draws gripper jaws 401 toward one another to a closed position.

Dual stroke solenoid 407 of FIG. 8 is attached at one end to picker carriage 801. A roller bearing 802 is attached to the other end of dual stroke solenoid 407. Dual stroke solenoid 407 may be activated to move to its rightmost extreme position as depicted in FIG. 8 or to its leftmost extreme position as depicted in FIG. 9. In either extreme position, dual stroke solenoid 407 requires no further electrical energy to remain at that position. Electrical energy is required only to move to the opposite extreme position. Roller bearing 802 opposes the force of spring 403 to draw gripper jaws 401 together and maintains the separation between gripper jaws 401. Tapered cams 803 decrease the separation between gripper jaws 401 as dual stroke solenoid 407 is activated to move roller bearing 802 to its leftmost extreme position as depicted in FIG. 9. The decreased separation between gripper jaws 401 and the spring tension to draw gripper jaws 401 together provides gripping force to hold a storage media cartridge between lips 805 as depicted in FIG. 2. The leftmost extreme position of dual stroke solenoid 407 permits gripper jaws 401 and lips 805 to close due to the bias tension of spring 403. The rightmost extreme position of dual stroke solenoid 407 forces gripper jaws 401 and lips 805 to open thereby releasing the grip on a storage media cartridge.

A storage media cartridge 102 may be gripped between lips 805 by activating dual stroke solenoid 407 to its leftmost extreme positions depicted in FIG. 9. A storage media cartridge may be released from the grip of lips 805 by activating dual stroke solenoid 407 to its rightmost extreme position as depicted in FIG. 8. Alteration of the size of roller bearing 802 and the shape of tapered cams 803 allows gripper jaws 401 to open and close to various dimensions for gripping different form factors of storage media cartridges.

Figure 10:
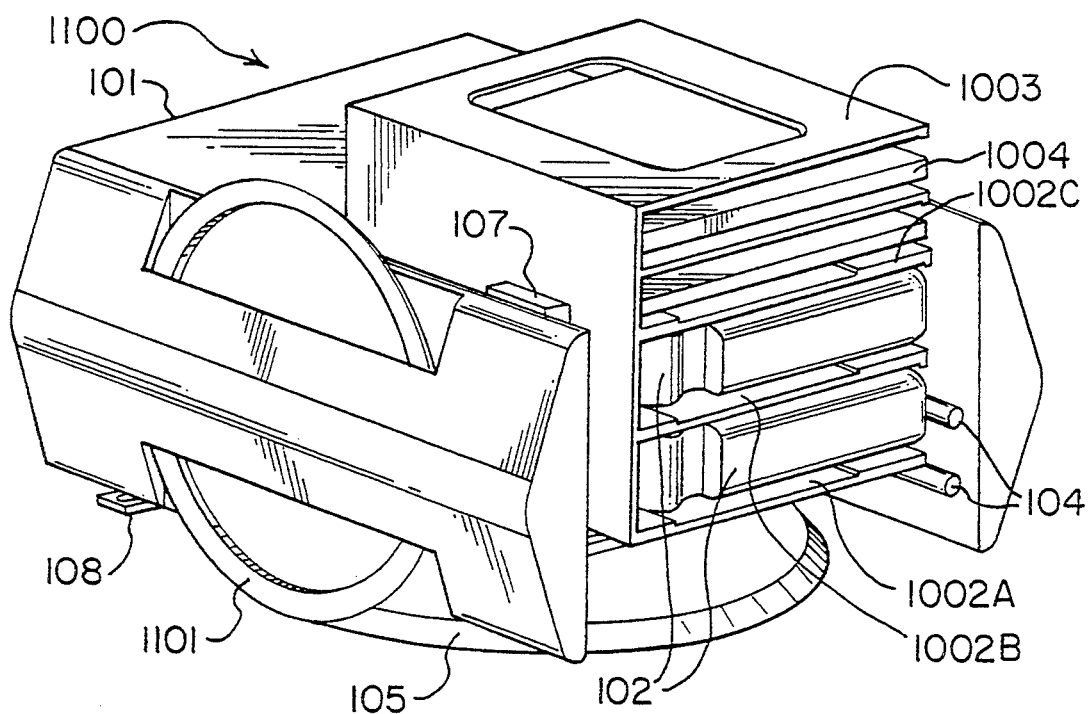
FIG. 10 shows a perspective view of another exemplary embodiment of the indexing hand of the present invention wherein the indexing tray slots are adapted to receive different types of media cartridges.

An alternate possible exemplary embodiment of the present invention is depicted in FIG. 10. Indexing hand 1000 of this alternate exemplary embodiment is the same as that of FIGS. 1 through 9 except that it has been adapted to hold three storage media cartridges in slots 1002A, 1002B and 1002C of indexing tray 1003. Storage media cartridges 102 in slots 1002A and 1002B are identical to those of FIG. 1. Slot 1002C in indexing tray 1003 is adapted to receive and retain storage media cartridge 1004. Storage media cartridge 1004 is depicted in FIG. 10 as a CDROM cartridge containing an optical read-only memory disc medium. Other storage media cartridge form factors may be utilized to increase the scope of application of the present invention.

Secondary beveled gear 1001 of FIG. 10 is adapted to enable moving of the larger indexing tray 1003. A larger secondary beveled gear 1001 is required to accommodate a larger indexing crank (not shown) to achieve the broader range of vertical motion demanded by the larger indexing tray 1003.

Rotation of secondary beveled gear 1001 is controlled to stop at 90 degree increments to position itself at each of the three slots 1002A 1002B and 1002C of indexing tray 1003. Counterclockwise rotation of primary beveled gear 105 through 90 degrees moves indexing tray 1003 from its lower position as depicted in FIG. 10 to its middle position. Continuing through a second 90 degrees counterclockwise rotation of primary beveled gear 105 moves indexing tray 1003 from its middle position to its upper position. A third 90 degrees counterclockwise rotation of primary beveled gear 105 moves indexing tray 1003 from its upper position back to its middle position. Finally, a fourth 90 degree counterclockwise rotation of primary beveled gear 105 returns indexing tray 1003 to its lower position as depicted in FIG. 10.

A full 360 degree counterclockwise rotation of primary beveled gear 105 imparts a full cycle of motion to indexing tray 1003 starting at it lower position, moving fully upward, then returning to its lower position. Clockwise rotation of primary beveled gear 105 imparts no motion to indexing tray 1003 because a ratcheting clutch slips (similar to 605 of FIG. 6).

The number of slots in indexing tray 1003 may be further varied by appropriately adapting the size of secondary beveled gear 1001 and the associated index crank, and by adapting the control of counterclockwise rotation of primary beveled gear 105.

Another possible exemplary embodiment contemplated by the present invention provides for a rotating carousel having slots adapted to receive storage media cartridges. The carousel is positioned in front of a picker assembly such as depicted in FIGS. 4 and 5. A secondary gear and indexing ratcheting clutch, similar to that disclosed in FIGS. 1 through 10, provides the rotational drive force to index the carousel when the primary gear is driven counterclockwise. When the primary gear is driven in a clockwise direction the indexing ratcheting clutch slips to retain the carousel in a stationary position as the picker assembly is moved forward and backward. Each slot around the carousel may be adapted to receive various types and formats of storage media cartridges.

It is expressly understood that the claimed invention is not to be limited to the description of the preferred embodiment but encompasses other modifications and alterations within the scope and spirit of the inventive concept.

I claim:

1. In a storage library subsystem providing for the robotic manipulation of storage media cartridges, a robotic hand apparatus for gripping and releasing said storage media cartridges to move said storage media cartridges within said storage library subsystem, said robotic hand apparatus comprising:

a slidable gripper means for controllably gripping and releasing said storage media cartridges;

tray means having a plurality of slots each capable of holding one of said storage media cartridges as said robotic hand is moved within said storage library subsystem;

a motor for moving said slidable gripper means and for moving said tray means, wherein said motor is operable to controllably rotate in either of two directions;

extension drive means operably responsive to a first direction of rotation of said motor for controllably sliding said slidable gripper means forward and backward into and out of said slots of said tray means;

indexing drive means operably responsive to a second direction of rotation of said motor for controllably moving said tray means so as to permit any one of said slots in said tray means to be aligned with said slidable gripper means such that said slidable gripper means may slide one of said storage media cartridges into or out of said one of said slots in said tray means;

extension clutch means attached to said extension drive means and to said motor such that when said motor is rotated in one direction, said extension clutch means engages to controllably move said extension drive means and such that when said motor is rotated in the opposite direction said extension clutch means slips to maintain a stationary position of said extension drive means; and indexing clutch means attached to both said index drive means and to said motor such that when said motor is rotated in one direction said indexing clutch means engages to controllably move said index drive means and such that when said motor is rotated in the opposite direction said indexing clutch means slips to maintain a stationary position of said index drive means.

2. The apparatus of claim 1 wherein said extension drive means further comprises:

extension rail means positioned parallel to the direction of said forward and backward sliding of said slidable gripper means for guiding said sliding motion of said slidable gripper means;

carriage means on said slidable gripper means adapted to slide on said extension rail means;

rotable extension crank means adapted to rotate in a plane parallel to the direction of said forward and backward sliding of said slidable gripper means, said rotable extension crank means having its axis of rotation at one end of said rotable extension crank means and a free end, said rotable extension crank means being operably engaged with said motor and with said extension clutch means to rotate in one direction;

extension cam follower means positioned at said free end of said extension crank means; and extension drive slot means attached to said carriage means and adapted to slidably receive said extension cam follower means for converting said rotation of said extension crank means into linear sliding motion of said carriage means on said extension rail means.

3. The apparatus of claim 1 wherein said indexing drive means further comprises:

linear slide bearing means attached to said tray means for guiding said motion of said tray means in a substantially vertical direction;

rotable index crank means adapted to rotate in a plane parallel to the direction of said motion of said tray means, said rotable index crank means having its axis of rotation at one end of said rotable index crank means and a free end, said rotable index crank means being operably engaged with said motor and with said indexing clutch means to rotate in one direction;

index drive slot means attached to said tray means and adapted to slidably receive said index cam follower means for converting said rotation of said rotable index crank means into linear vertical motion of said tray means on said linear slide bearing means.

4. The apparatus of claim 1 wherein said extension drive means and said index drive means further comprises:

extension rail means positioned parallel to the direction of said forward and backward sliding of said slidable gripper means for guiding said sliding motion of said slidable gripper means;

carriage means on said slidable gripper means adapted to slide on said extension rail means;

rotable extension crank means adapted to rotate in a plane parallel to the direction of said forward and backward sliding of said slidable gripper means, said rotable extension crank means having its axis of rotation at one end of said rotable extension crank means and a free end, said rotable extension crank means being operably engaged with said motor and with said extension clutch means to rotate in one direction;

extension cam follower means positioned at said free end of said rotable extension crank means;

extension drive slot means attached to said carriage means and adapted to slidably receive said extension cam follower means for converting rotation of said rotable extension crank means into linear sliding motion of said carriage means on said extension rail means;

linear slide bearing means attached to said tray means for guiding said motion of said tray means in a substantially vertical direction;

rotable index crank means adapted to rotate in a plane parallel to the direction of said motion of said tray means, said rotable index crank means having its axis of rotation at one end of said rotable index crank means and a free end, said rotable index crank means being operably engaged with said motor and with said indexing clutch means to rotate in one direction; index cam follower means positioned at said free end of said rotable index crank means; and index drive slot means attached to said tray means and adapted to slidably receive said index cam follower means for converting rotation of said rotable index crank means into linear vertical motion of said tray means on said linear slide bearing means.

5. The apparatus of claim 4 comprising:

a primary beveled gear engaged with said extension clutch means and controllably rotated by said motor and positioned to rotate in a plane parallel to the plane of rotation of said rotable extension crank;

wherein when said primary beveled gear is rotated in one direction said extension clutch means engages to rotate said rotable extension crank and such that when said primary beveled gear is rotated in the opposite direction said extension clutch means slips to maintain a stationary position of said rotable extension crank;

a secondary beveled gear positioned to rotate in the plane of rotation of said rotable index crank and perpendicular to the plane of rotation of said primary beveled gear;

wherein when said secondary beveled gear is rotated in one direction said indexing clutch means engages to rotate said rotable index crank and such that when said secondary beveled gear is rotated in the opposite direction said indexing clutch means slips to maintain a stationary position of said rotable index crank; and said secondary beveled gear and said primary beveled gear being further adapted to mesh teeth at their beveled edges such that rotation of said primary beveled gear rotates said secondary gear in an opposing direction.

6. The apparatus of claim 1 wherein said slidable gripper means further comprises:

gripper jaw means having an upper jaw component and a lower jaw component for gripping one of said storage media cartridges;

bias force means for biasing said gripper jaw means upper and lower components to a normal rest separation position; and separation force means for driving said gripper jaw means upper and lower components opposite the direction of said bias force means to an extreme separation position.

7. The apparatus of claim 6 wherein:

said bias force means comprises spring means to draw said gripper jaw means upper and lower components toward one another to a closed position adapted to grip one of said storage media cartridges; and said separation force means further comprises:

tapered cam means attached to each of said upper and said lower gripper jaw components;

roller bearing means adapted to fit between said tapered cam means for controllably forcing said gripper jaw upper and lower components to separate against said bias force spring means; and dual stroke solenoid means for moving said roller bearing means between said tapered cam means, said solenoid being further adapted such that when actuated to move said roller bearing means to one extreme position, said gripper jaw upper and lower components are permitted to close by the force imparted by bias force spring means, said solenoid means being further adapted such that when actuated to move said roller bearing means to the opposite extreme position, said roller bearing means are forced against said tapered cam means so as to separate said gripper jaw upper and lower components against the force of said bias force spring means.

8. The apparatus of claim 1 wherein said tray means are further adapted so that various types and formats of said storage media cartridges may be received and retained in said slots of said tray means.

* * * * *